United States Patent
Cucala Garcia

(10) Patent No.: US 9,451,591 B2
(45) Date of Patent: Sep. 20, 2016

(54) METHOD AND A SYSTEM FOR ASSIGNING RADIO RESOURCES TO SMALL CELLS IN 3GPP NETWORKS

(71) Applicant: Telefonica, S.A., Madrid (ES)

(72) Inventor: Luis Cucala Garcia, Madrid (ES)

(73) Assignee: Telefonica, S.A., Madrid (ES)

( * ) Notice: Subject to any disclaimer, the term of this patent is extended or adjusted under 35 U.S.C. 154(b) by 0 days.

(21) Appl. No.: 14/411,716

(22) PCT Filed: Jun. 3, 2013

(86) PCT No.: PCT/EP2013/061405
§ 371 (c)(1),
(2) Date: Dec. 29, 2014

(87) PCT Pub. No.: WO2014/001025
PCT Pub. Date: Jan. 3, 2014

(65) Prior Publication Data
US 2015/0195815 A1    Jul. 9, 2015

(30) Foreign Application Priority Data

Jun. 29, 2012 (ES) .................................. 201231013

(51) Int. Cl.
| | |
|---|---|
| *H04W 72/04* | (2009.01) |
| *H04W 28/08* | (2009.01) |
| *H04L 12/801* | (2013.01) |
| *H04L 12/911* | (2013.01) |
| *H04W 28/12* | (2009.01) |
| *H04W 92/04* | (2009.01) |
| *H04W 28/16* | (2009.01) |

(52) U.S. Cl.
CPC .............. *H04W 72/04* (2013.01); *H04L 47/14* (2013.01); *H04L 47/829* (2013.01); *H04W 28/08* (2013.01); *H04W 28/12* (2013.01); *H04W 92/045* (2013.01); *H04W 28/16* (2013.01)

(58) Field of Classification Search
None
See application file for complete search history.

(56) References Cited

U.S. PATENT DOCUMENTS

| | | |
|---|---|---|
| 2010/0091667 A1 | 4/2010 | Kazmi et al. |
| 2011/0105139 A1 | 5/2011 | On |
| 2011/0252123 A1 | 10/2011 | Sridhar et al. |

(Continued)

OTHER PUBLICATIONS

Torsten Musiol., "Transport", In: "LTE for UMTS: Evoluation to LTE-Advanced", Mar. 4, 2011, John Wiley and Sons, XP055090093, ISBN: 978-0-47-066000-3 pages 325-350, DOI: 10.1002/9781119992943.ch12.

(Continued)

*Primary Examiner* — Kodzovi Acolatse
(74) *Attorney, Agent, or Firm* — Sughrue Mion, PLLC

(57) ABSTRACT

The method providing by a plurality of eNodeB wireless mobile connectivity to a plurality of User Equipment (UE) and aggregating by means of a node running in non-3GPP network, backhaul load information related to the access line of said plurality of eNodeB or any other remote equipment. The method also, retrieving by a Proxy Serving Gateway (Proxy S-GW) located in said non-3GPP node, said backhaul load information from said non-3GPP node of said plurality of eNodeB; then, communicating said Proxy S-GW with a Service Gateway (S-GW) pertaining to a 3GPP network by means of a standard S1 interface; and finally sending to said S-GW said backhaul load information through said standard S1 interface in order to assign radio resources to said plurality of eNodeB.
The system is adapted for implementing the method of the invention.

11 Claims, 6 Drawing Sheets

(56) References Cited

U.S. PATENT DOCUMENTS

| | | | |
|---|---|---|---|
| 2012/0129522 A1* | 5/2012 | Kim | H04W 72/0426 |
| | | | 455/434 |
| 2013/0079011 A1* | 3/2013 | Duda | H04L 12/2439 |
| | | | 455/436 |
| 2013/0163424 A1* | 6/2013 | Goerke | H04W 24/02 |
| | | | 370/235 |
| 2013/0210409 A1* | 8/2013 | Grayson | H04W 24/02 |
| | | | 455/418 |

OTHER PUBLICATIONS

Vodafone et al., "Add measurements for radio coverage, radio/transport/hardware resource utilization, handover triggering, RACH performance", 3GPP Draft; S5-111517_CR R10 32 425 the Rest of Add Measurements for Radio Coverage, Rad10_Transport_Hardware Resource Utilization, Handover Triggering, RACH Performance, 3rd Generation Partnership Project (3GPP), Mobile Competence Centre ; 650, Rout, vol. SA WG5, No. San Diego. USA; 20110228-20110304, Mar. 7, 2011, XP050648772.

"3rd Generation Partnership Project; Technical Specification Group Services and System Aspects; Telecommunication management; Performance Management (PM); Performance measurements Evolved Universal Terrestrial Radio Access Network (E-UTRAN) (Release 11)", 3GPP Standard; 3GPP TS 32.425, 3rd Generation Partnership Project (3GPP), Mobile Competence Centre ; 650, Route Des Lucioles ; F-06921 Sophia-Antipolis Cedex; France, vol. SA WG5, No. VII.2.0, Mar. 16, 2012, pp. 1-67, XP050580449, [retrieved on Mar. 16, 2012] p. 61.

International Search Report for PCT/EP2013/061405 dated Dec. 19, 2013.

Written Opinion for PCT/EP2013/061405 dated Dec. 19, 2013.

* cited by examiner

METHOD AND A SYSTEM FOR ASSIGNING RADIO RESOURCES TO SMALL CELLS IN 3GPP NETWORKS

CROSS REFERENCE TO RELATED APPLICATIONS

This application is a National Stage of International Application No. PCT/EP2013/061405 filed Jun. 6, 2013, claiming priority based on Spanish Patent Application No. 201231013, filed Jun. 29, 2012, the contents of all of which are incorporated herein by reference in their entirety.

FIELD OF THE ART

The present invention generally relates to wireless communications, and more specifically, in a first aspect, to a method for assigning radio resources to small cells in 3GPP networks.

A second aspect of the invention relates to a system adapted for implementing the method of the first aspect.

PRIOR STATE OF THE ART

Small Cells (SC), also known as picocells or femtocells, are low power base stations that provide wireless mobile connectivity to wireless devices known as user equipment (UE), or more popularly called mobile or cellular terminals. This wireless mobile connectivity is usually called Mobile Broadband (MBB) connectivity and is supported by standards like those promoted by 3GPP, for example UMTS (Universal Mobile Telecommunications System), HSPA (High Speed Packet Access) or LTE (Long Term Evolution). In this sense, a small cell is a low capacity base station, called NB or eNB in 3GPP. Although the term small cell is usually devoted to this type of base stations, it is admitted that a small cell can also include a non-3GPP radio, for example an IEEE 802.11 Wi-Fi radio, for providing additional connectivity services to the UE's.

The Small Cells are installed in outdoor or indoor locations for providing public service, and are connected to the mobile operator's core network by means of some kind of access or backhaul connectivity. This backhaul connectivity can include a wireless section and a wired section. An example of a wireless section is a radio link that connects one or many small cells to a radio hub, from which a wired connection is provided to the core network. Some examples of a wired section are an optical fibre or a copper pair.

An example of a wireless backhaul for small cells is a point to point link, supported on any frequency band and making use of any kind of radio interface. Another example of wireless backhaul is a point to multipoint link, where a single radio hub can provide simultaneous backhaul to many small cells, again on any frequency band and making use of any kind of radio interface. The data rate that in both cases is available for the small cells backhaul of every small cell depends on the specific radio interface and frequency band, and in the case of point-to-multipoint radio solutions, on the load of every radio link between a small cell and the radio hub, because the total capacity of the radio hub is shared between the small cells' backhaul links.

Another option for the small cells backhaul is the access copper pair, which an attractive option is given its widespread availability in urban areas. The copper pair can be used to support xDSL (Digital Subscriber Loop) data connectivity, for example ADSL (Asymmetric Digital Subscriber Line) or VDSL (Very high bit-rate Digital Subscriber Line). In this scenario, an xDSL modem is installed near the small cell, and the small cell is connected to the modem typically by means of an Ethernet connection, but it could be a wireless connection. The xDSL modem encapsulates the data from/to the small cell in xDSL frames, which are modulated and sent through the copper pair up to a DSLAM (Digital Subscriber Line Access Multiplexer), which can be connected through a telecommunications network to the mobile operator's core network. The data rate available in a copper pair supporting ADSL or VDSL depends on the copper loop length and the data activity in the other copper pairs that share the same cable.

Another option for the small cells backhaul are the fibre access solutions, in particular those solutions that enable to share the fibre capacity between many users, like GPON. In a GPON network the fibre from the switching station is splitted, by means of optical splitters, in many fibre branches, each one devoted to a final user. In this architecture, the total capacity of the GPON network is divided between the final users, and the capacity available for every user depends on the splitting ratio of the fibre and the capacity used by the other users, because GPON allows a dynamic capacity assignment for every fibre branch depending on capacity demand and the user's service level agreement.

On the other hand, the backhaul data rate requirements of the small cell must match the data rate capability of the access network being used, for example the data rate capabilities of an xDSL on a copper pair, considering that there are different requirements in the downstream (data to be sent to the small cell from the mobile operator's core network) and in the upstream (data to be sent from the small cell to the mobile operator's core network), and that the requirements depend if the small cell is dimensioned to serve the loaded hour mean traffic to the UE's, or it is dimensioned to serve peak traffic requirements to the UE's. As a result, small cells backhaul data rate requirements range from around 10 Mbps for an HSPA small cell, to up 80 Mbps or more when peak data rate in an LTE small cell needs must be supported.

Another important issue in the small cells deployment is how to assign the UE's traffic to the small cells, or to another layer of base stations of the radio network, for example to the macrocell layer. This technical aspect is usually known as "load balancing" and has an important impact in heterogeneous radio networks, where many base station operating in different radio frequencies and with different radio standards can serve the UE's traffic demands, and some procedures must be introduced to balance the traffic load among the base stations. Current load balancing procedures make use of radio interface parameters to decide the balancing process, or take into account the user profile or the kind of service being demanded.

Problems with Existing Solutions:

In the case of a wireless backhaul for small cells, being point to point link or point to multipoint link, the data rate available for the small cells backhaul of every small cell is not constant and depends on factors like the radio interference from other radios in the neighbourhood, the load of every link in a point to multipoint architecture, or the weather conditions.

The same non-constant data rate availability situation happens when backhaul is supported by xDSL. Current xDSL technologies provide commercial services of up-to 20 Mbps in the downstream for ADSL2+, or up-to 50 Mbps for VDSL, for copper pair loop lengths of 500 m or shorter. This data rate capability is not ensured, because many copper pairs share a single cable and they interfere with each other, and this interference depends on the degree of use of every pair. This means that the data rate provided by an xDSL modem fluctuates with time.

In the case of a GPON backhaul for small cells, or any similar point-to-multipoint fibre architecture, even though the fibre capacity is usually higher than that provided by the copper pair, the GPON capacity is still shared between many final users, and thus the available throughput for a small cell will depend on the traffic supported on the other branches of the GPON network.

On the other hand, the small cell data traffic is not constant either. During many hours (e.g. during the night) the supported traffic to the UE's is very low, and only around the busy hour the small cell supported traffic to and from the UE's is important. The small cell traffic is not constant in a small scale either, because traffic to and from the UE's is bursty and the peak data rate depends on the UE radio propagation conditions and the activity of the other UE's. This means that the small cell backhaul is usually dimensioned to support some mean traffic, which is expected to cope with some degree of probability the UE's traffic demand during the busy hour, but it is possible that the data traffic cannot be supported by the backhaul in some periods of time, and it is also possible that UE's peak data rates cannot be supported by the backhaul.

Due to these limitations of some of the small cells' backhaul technologies, and the variable traffic demand of every small cell, it would be useful that the mobile network could balance the UE's traffic load of the small cells, between different small cells or between the small cell layer and other radio layers like the macrocell layer, taking into account the degree of load of the backhaul of every small cell and how close it is to its maximum capacity.

But currently the mobile network, for example the UMTS, HSPA or LTE network, cannot take into account the load of the backhaul of each base station for performing the load balancing procedures. This is due to the fact that 3GPP only standardizes interfaces between its network nodes that are agnostic to the specific transmission technology used to support them, and thus:

The 3GPP network is not aware of the specific access line assigned for supporting a small cell backhaul.

The status of the access line used for every backhaul is not known by the 3GPP network.

The 3GPP network is not aware of the status of the non-3GPP nodes that aggregate the access lines, like a radio hub, an xDSL DSLAM or a GPON OLT.

The situation that arises from not knowing the small cells backhaul status is that any current load balancing procedure in a radio network can take wrong decisions, for example diverting UE's traffic from a loaded macrocell base station to a target small cell that cannot accommodate that traffic because its backhaul is saturated.

A known network backhaul aggregation process is disclosed for instance in [4]. Said document refers to radio transport solutions for transferring data between base stations and the core network. With regard to "backhaul load information", it mentions a) throughput requirements (paragraph 12.4.1) and b) Transport QoS (paragraph 12.6.2). Therefore, is concerned about throughput in terms of load but does not relate to load reporting.

DESCRIPTION OF THE INVENTION

It is, therefore, a primary object of this invention to provide a method for assigning radio resources to small cells in 3GPP networks.

The method, as commonly known in the field, comprises: providing by a plurality of eNodeB wireless mobile connectivity to a plurality of User Equipment (UE) and aggregating by means of a node running in non-3GPP network backhaul load information, related to the access line of said plurality of eNodeB or any other remote equipment.

In a characteristic manner and on contrary to the known proposal, the method further comprises the following steps:

a) retrieving by a Proxy Serving Gateway (Proxy S-GW) located in said non-3GPP node, said backhaul load information from said non-3GPP node of said plurality of eNodeB;

b) communicating said Proxy S-GW with a Service Gateway (S-GW) pertaining to a 3GPP network by means of a standard S1 interface; and c) sending to said S-GW said backhaul load information through said standard S1 interface in order to assign radio resources to said plurality of eNodeB.

According to an embodiment, the Proxy S-GW receives a MAC address of each one of the interfaces of said non-3GPP node and a traffic load of said MAC address.

According to another embodiment, each one of the plurality of eNodeB includes an eNodeB identification and a MAC address of said eNodeB.

Then, the MAC address of the interfaces and its traffic load and the identification and the MAC address of the eNodeB, termed as information elements, are send from the Proxy S-GW and from the eNodeB to the S-GW through the standard S1 interface.

In an embodiment, the S-GW further performs a mapping of said information elements.

The invention does not preclude any network element to make the mapping between the information elements. For that reason, according to an embodiment, the information elements are transmitted from the S-GW to a Packet Data Network Gateway (PDN-GW) and there is further performed the mapping.

According to another embodiment, the information elements are transmitted from the S-GW to the PDN-GW, and then retransmitted to a Policy and Charging Rules Function (PCRF) node. The PCRF node is then in charge of further performing the mapping of the information elements.

Finally, the mapping of the information elements can also be performed in an element manager node specifically dedicated to load balancing policies or in an Operations support system (OSS) and/or Operation & Maintenance (O&M) system.

Once the mapping is done, the PDN-GW, the PCRF or any other network element can make use of it in order to take decisions related with the UE connections and the balance of the eNodeB, considering the load balancing of backhaul load of each one of said plurality of eNodeB represented by its MAC address.

Moreover, the aggregation of said backhaul load information by said non-3GPP node is performed as a point-to-multipoint radio hub, a DSLAM or an OLT.

The MAC address of the interfaces and said MAC address of said eNodeB are a unique identifier following any of the formats defined by the IEEE such as a MAC-48 and EUI-48 or EUI-64, among others. And the traffic load is any instantaneous throughput measure as bits per second, an average throughput over a given time, or a percentage of the maximum throughput supported by each one of said MAC address interface.

Finally, the eNodeB can be identified by many ways standardized by 3GPP such as a Global eNB ID or an E-UTRAN CGI (ECGI), among others.

Another object of this invention is to provide a system for assigning radio resources in 3GPP networks, which according to common use in the field, comprises:
- a plurality of eNodeB adapted to provide wireless mobile connectivity to a plurality of User Equipment (UE); and
- a node running in a non-3GPP network arranged to aggregate a backhaul load information related to the access line of said plurality of eNodeB;

In a characteristic manner and on contrary to the known proposal, the system further comprises:
- a Proxy Serving Gateway (Proxy S-GW) located in said non-3GPP node, arranged to retrieved said backhaul load information from said non-3GPP node of said plurality of eNodeB; and
- a standard S1 interface arranged to communicate said Proxy S-GW with a Service Gateway (S-GW) pertaining to a 3GPP network.

The system of the invention is arranged to implement the method of the invention.

Additional features and advantages of the disclosure will be described below. A person skilled in the art could introduce changes and modifications in the embodiments described without departing from the scope of the invention as it is defined in the attached claims.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

This invention provides a Proxy Serving Gateway (Proxy S-GW), a delegate function of the 3GPP's S-GW, that runs in the non-3GPP node that performs the access lines aggregation functionality, for example a point-to-multipoint radio hub, a DSLAM o an OLT.

The Proxy S-GW is an instance of the S-GW, and communicates with the S-GW by means of the S1 interface, which is defined for communication between the eNB and the S-GW, but also for communication between different S-GW's. The Proxy S-GW communicates with the S-GW by means of the standard S1 interface, to this effect, the Proxy S-GW is a simplified S-GW, whose only function is to communicate with the non-3GPP aggregation node on order to retrieve eNB's backhaul load, and communicate this backhaul load information to the S-GW.

Figure 1:
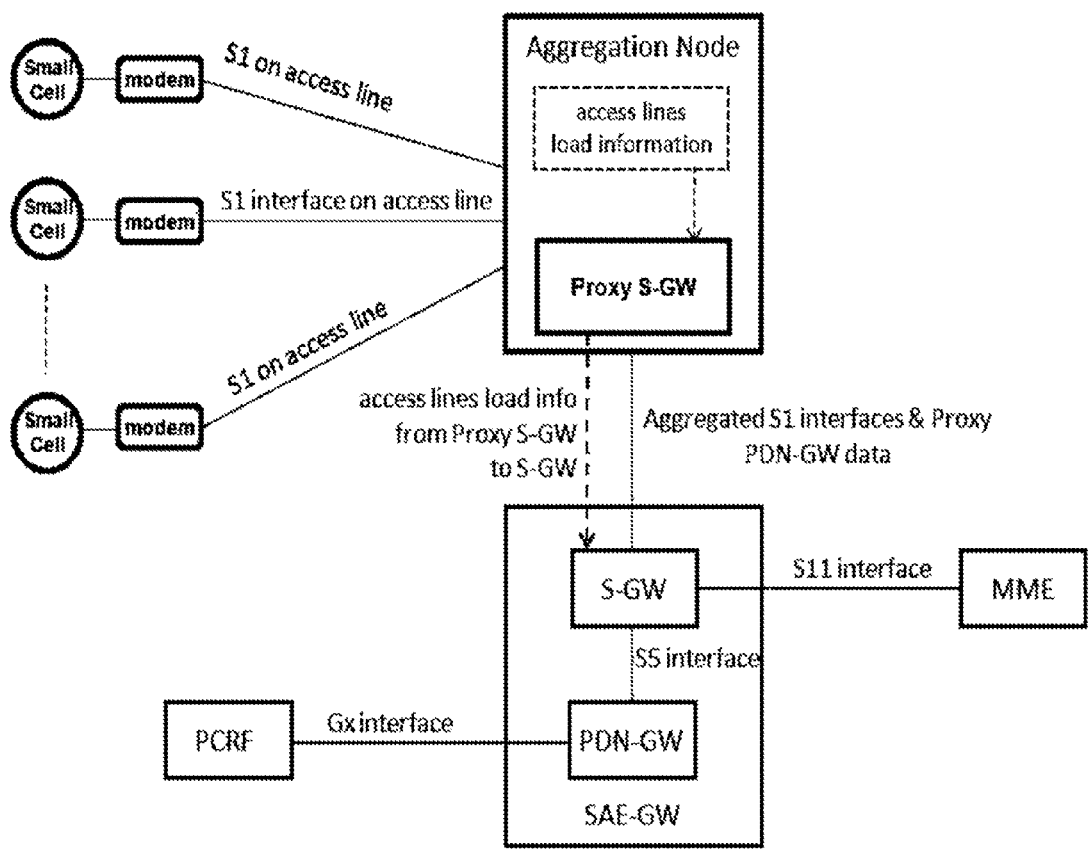
FIG. 1 is the general scheme of the proposed architecture of the present invention, based in 3GPP's specifications.

FIG. 1 shows in an embodiment a general scheme of the proposed architecture, based in 3GPP's specifications [1] where it can be seen the two elements introduced in this invention, the Proxy S-GW and its interface with the S-GW.

New Information Elements (IE) in the S1 Interface:

This invention introduces two new Information Elements (IE) in the S1 interface. The current definition of GPP's Information Elements is specified in 3GPP TS 36.413 [2]. One of the new IE's is generated by the eNodeB, and the other one by the Proxy S-GW. The rationale for this procedure is that the non-3GPP aggregator node does not know any information about the eNode's that are supported by it, but does know the MAC addresses of every link that it supports, and the traffic load of every link, and at the same time the 3GPP EPC knows the identities of the eNodeB's but does not know the load of the links that support their S1 interfaces. The introduction of the new Information Elements can help to make the mapping in the EPC between the eNodeB Identity, its MAC address and the load of the link that supports the eNodeB S1 interface.

The new IE's are as follows:

MAC-eNB Identification (MACEI). This IE is generated by the eNodeB, and it includes the eNodeB identification and the layer 2 MAC address of the eNodeB.

The eNodeB can be identified by many ways standardized by 3GPP, and this invention does not preclude any of them. For example, the eNodeB can be identified by means of the Global eNB ID, as it is defined in 3GPP TS 36.413 section 9.2.1.37, which is a combination of the PLMN Identity and the eNB Identity, the latter requiring 20 or 28 bits. Another example is the E-UTRAN CGI (ECGI), as it is defined in 3GPP TS 36.413 section 9.2.1.38, which is a combination of the PLMN Identity and the Cell Identity, the latter requiring 28 bits.

The MAC address of the eNodeB is a unique identifier assigned to the network interface of the eNodeB and used for identification in the Media Access Control protocol sub-layer of the OSI reference model. There are different formats for the MAC address and this invention does not preclude any of them. For example, the MAC address can follow any of the formats defined by the Institute of Electrical and Electronics Engineers (IEEE), like MAC-48 and EUI-48, which require 48 bits, or EUI-64 which requires 64 bits. The eNodeB generates the MACEI IE to the S-GW through the S1 interface.

MAC Load (MACL). This IE is generated by the Proxy S-GW, and it includes a MAC address and a load of that MAC address.

The MAC address in the MACL is a unique identifier that can follow any of the formats defined by the Institute of Electrical and Electronics Engineers (IEEE), like MAC-48 and EUI-48, which require 48 bits, or EUI-64 which requires 64 bits. Every MAC address in every MACL will be obtained by the Proxy-SW from the non-3GPP aggregator node where it is installed; the non-3GPP aggregator node will provide to the Proxy-SW a list of the MAC addresses it is supporting. The MAC address load is also provided from the non-3GPP aggregator node to the Proxy-SW. The format of the MAC address load can be an instantaneous throughput measures as bits per second, an average throughput over a given time, or a percentage of the maximum throughput supported by that MAC address interface, and this invention does not preclude any possible implementation.

The Proxy S-GW generates the MACL IE for every MAC address reported by the non-3GPP aggregator node to the Proxy S-GW and sends them through the S1 interface to the S-GW.

Figure 2:
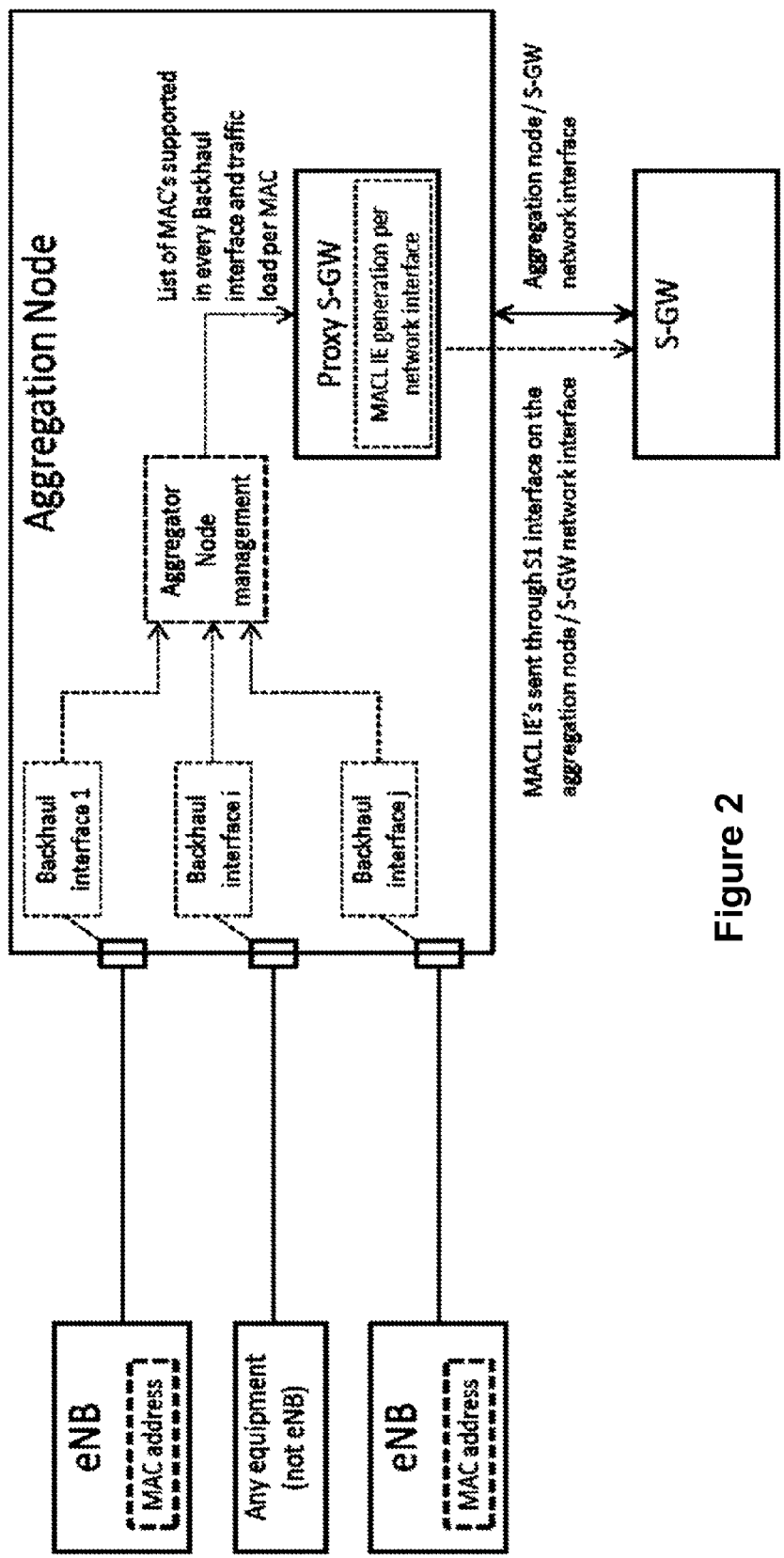
FIG. 2, is an illustration representing the generation and transmission of MACL IE in the Proxy S-GW, according to an embodiment.

Generation and Transmission of MACL IE in the Proxy S-GW:

FIG. 2, shows the generation and transmission of MACL IE in the Proxy S-GW. The Proxy Serving Gateway (Proxy S-GW) is delegate function of the S-GW that runs in the non-3GPP node that performs the access lines aggregation functionality, for example a point-to-multipoint radio hub, a DSLAM or an OLT. The Proxy S-GW communicates with the S-GW by means of the standard S1 interface, which is supported by any network interface between the aggregation node and the S-GW.

The role of the Proxy S-GW is to communicate with the non-3GPP aggregation node in order to receive information of the MAC addresses supported by the aggregation node's backhaul interfaces, and the traffic load of every of those MAC's. The communications interface between the Proxy S-GW and the aggregation node will depend on the type of aggregator and it is out of the scope of this invention.

The aggregation node supports a set of communication interfaces, or backhaul interfaces, which can support the eNB's or any other remote equipment. The aggregation node typically includes a functionality for the management of its interfaces, which can be called "aggregator node management". The aggregator node management can know the MAC address of every remote equipment support by every of its backhaul interfaces, for example the eNB MAC address, and also can know the traffic supported by that backhaul interface from the remote equipment or eNB to the aggregation node.

The aggregation node manager will provide to the Proxy S-GW a list of MAC addresses that it supporting through its backhaul interfaces, and the traffic load for every MAC, in the form of pairs (MAC address/load for that MAC). The aggregator node manager does not have any knowledge of the type of equipment supported by its backhaul interfaces, eNB's or any other, and will simply provide the list of pairs (MAC address/load for that MAC) to the Proxy S-GW.

Figure 3:
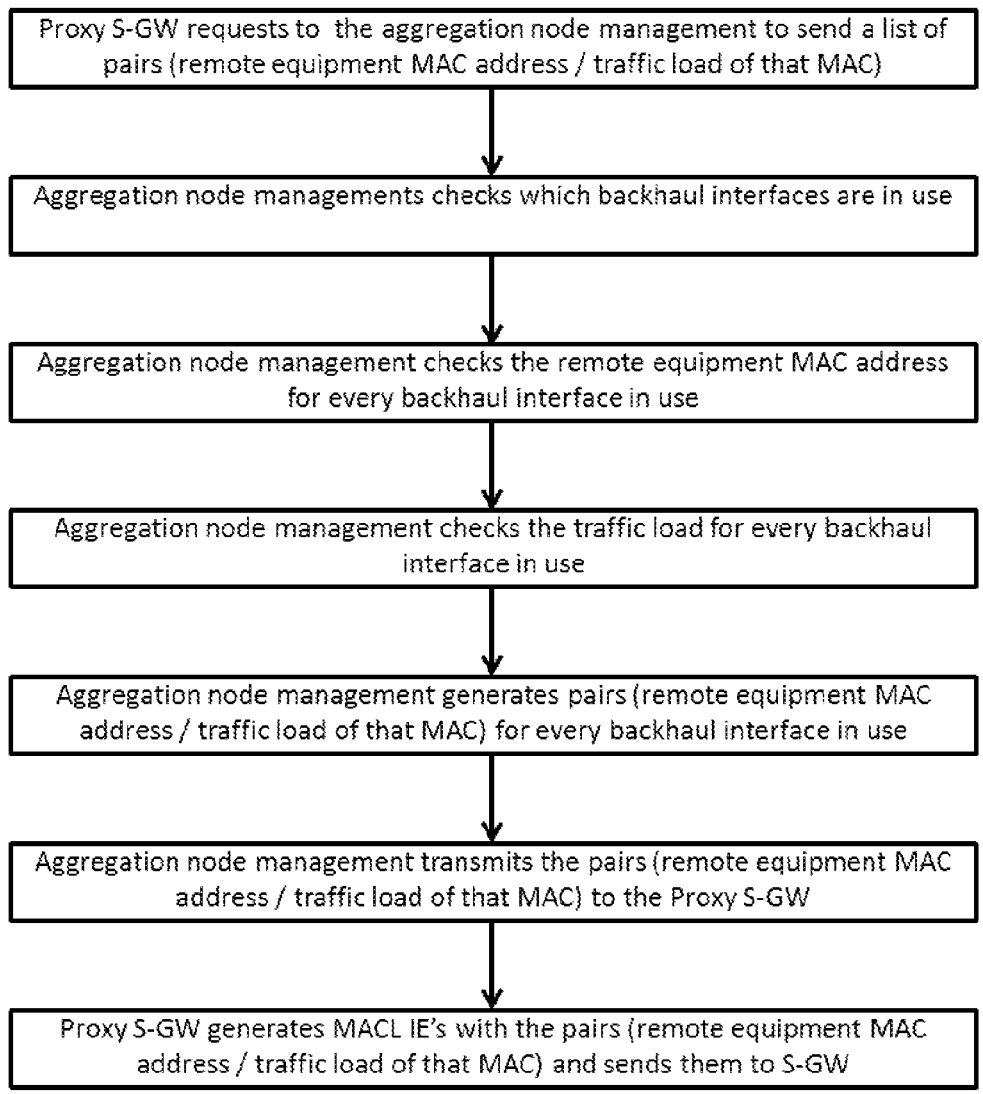
FIG. 3, is a flow diagram showing the detailed process for the generation and transmission of MACL IE in the Proxy S-GW, according to an embodiment.

The Proxy S-GW will use the list of pairs (MAC address/load for that MAC) to send MACL IE's for every pair to the S-GW, through the S1 interface between the Proxy S-GW and the S-GW, which will be supported by a network interface between the aggregation node and the S-GW. The detailed explained process is showed in FIG. 3.

Figure 4:
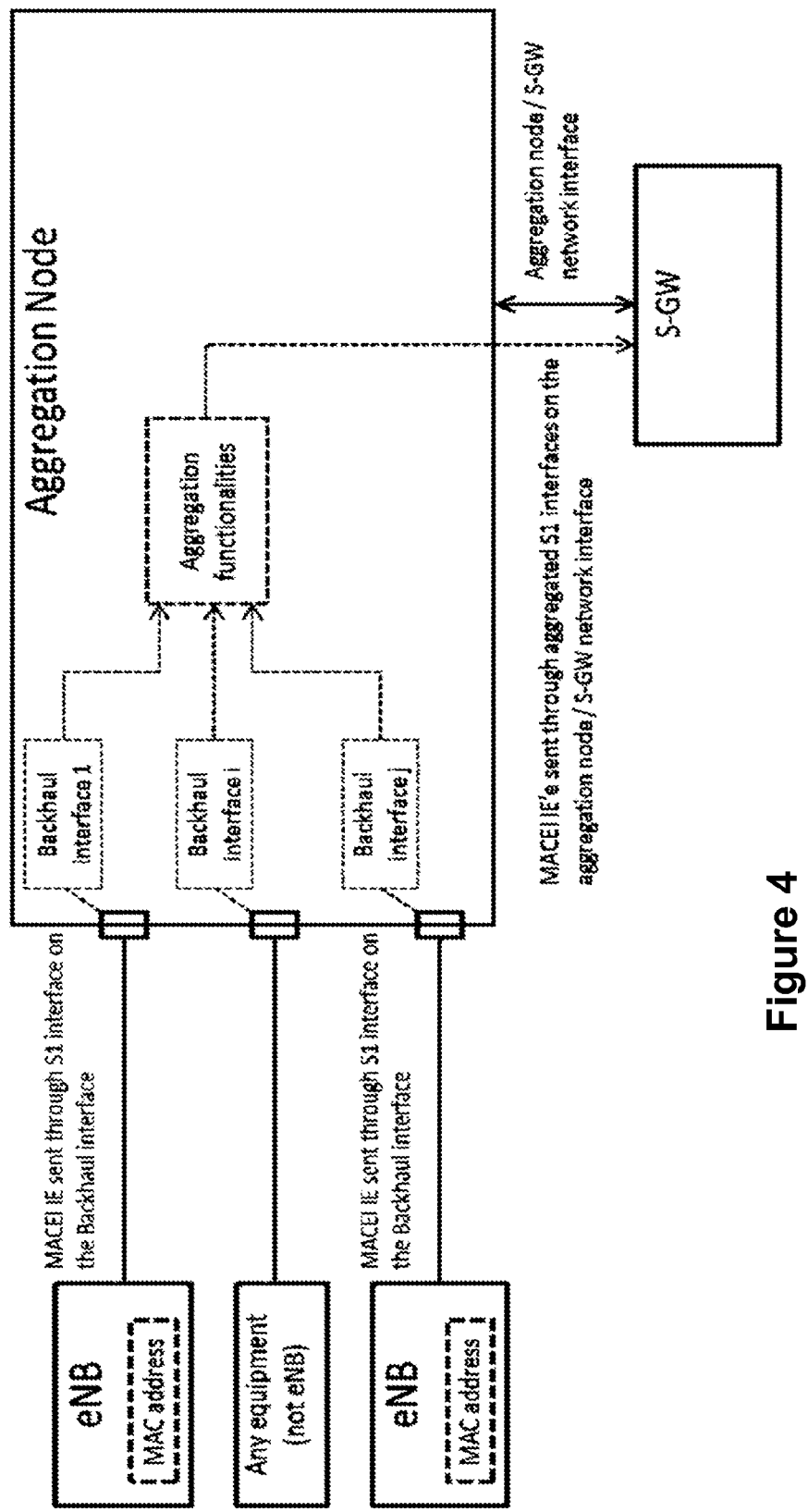
FIG. 4, is an illustration representing the generation and transmission of MACEI IE in the eNB, according to an embodiment.

Generation and Transmission of MACEI IE in the eNB:

FIG. 4, shows the generation and transmission of MACEI IE in the eNB. Every eNB incorporates a MAC address assigned to its backhaul network interface, this assignment is typically done by the manufacturer of the eNB and the MAC address is locally recorded in the eNB. On the other hand, the eNB is identified by any of the ways standardized by 3GPP, and this invention does not preclude any of them, for example the Global eNB ID, or the E-UTRAN CGI (ECGI). The eNB identification is also locally recorded in the eNB.

In one embodiment of this invention, the eNB uses the eNB identification and the backhaul network interface MAC address to generate the MAC-eNB Identification (MACEI) Information Element (MACEI IE). The MACEI IE is sent from the eNB to the S-GW, when the eNB is first installed or whenever any network element in the EPC or the OSS requests to the eNB to send it.

Figure 5:
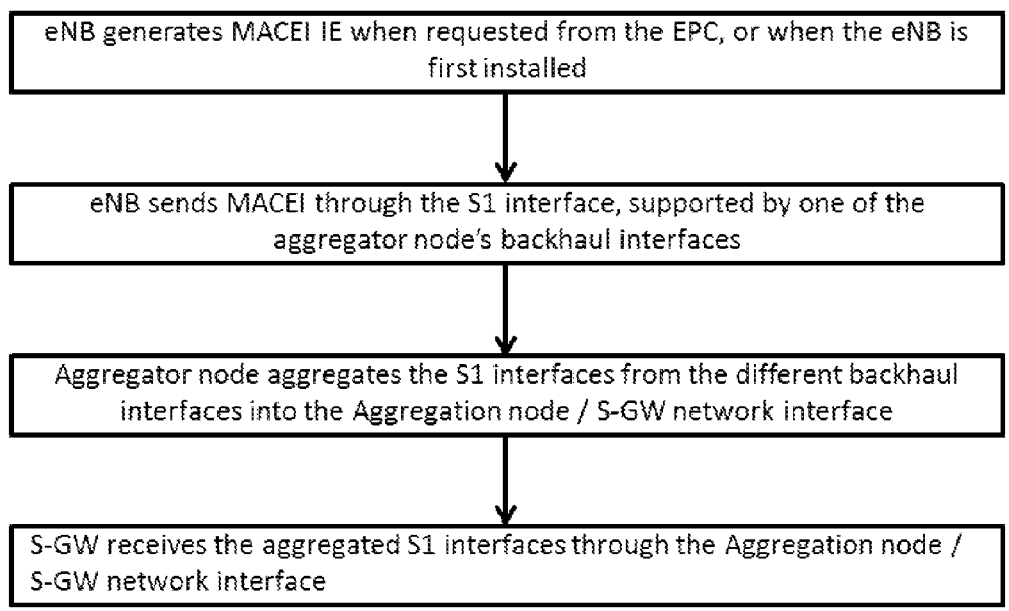
FIG. 5, is a flow diagram showing the detailed process for the generation and transmission of MACEI IE in the eNB, according to an embodiment.

The eNB sends the MACEI IE through the standard S1 interface between the eNB and the S-GW, which will be supported by the backhaul interface between the eNB and the aggregation node, the aggregation node, and the network interface between the aggregation node and the S-GW. The function of the aggregation node will be to aggregate the data flows from a number of backhaul interfaces into a single flow which will be transmitted between the aggregation node and the S-GW, and thus the aggregation node is transparent to the S1 interface between any of the eNB's and the S-GW. The detailed process is described in FIG. 5.

Backhaul Load Mapping to an eNB:

Currently 3GPP standards does not define which network element is in charge with managing the load balance between the eNB's of the Radio Access Network (RAN), in particular when many different 3GPP-standarized RAN are connected to the EPC, or when non-3GPP radio networks are connected to the EPC.

This invention does not preclude any network node to make the mapping between the eNB ID and MAC address information provided by the MACEI IE, and the MAC address load provided by the MACL IE.

The procedure to make this mapping in any of these network nodes is as follows. The network node will receive the MACEI Information Elements and the MACL Information Elements, and will generate a table with the eNB ID's, the eNB MAC's, the aggregator node backhaul interfaces remote equipment MAC's, and the aggregator node backhaul interfaces load. The table makes possible to match the eNB MAC's reported in the MACEI IE's, with the backhaul interfaces remote equipment MAC's reported in the MACL IE, and thus identify the traffic load of the backhaul interface of every eNB. Some the backhaul interfaces of the aggregator node will not support an eNB and therefore there will not be a match for some backhaul interfaces remote equipment MAC's reported in the MACL IE, and these MAC addresses will not be taken into account by the network element that implements the load balance between eNB's. A possible example of this table is shown as follows.

| | | MACL IE | | | |
|---|---|---|---|---|---|
| MACEI IE | | Backhaul interface remote | Backhaul | | Mapping eNB → |
| eNB ID | eNB MAC | equipment MAC | interface load | Match? | backhaul load |
| eNB x | MAC x | MAC x | Load x | Yes | eNB x → Load x |
| | | MAC a | Load a | No | |
| eNB y | MAC y | MAC y | Load y | Yes | eNB y → Load y |
| eNB z | MAC z | MAC z | Load z | Yes | eNB z → Load z |
| | | MAC b | Load b | No | |

Some of the possible network elements where this mapping can be done are the following:

Mapping in the S-GW

The S-GW generates a table with eNB's identifications, their MAC address (obtained from the MACEI IE's) and the load of every MAC address (obtained from the MACL IE), from which the determination of pairs of eNB/backhaul load is straightforward. The eNB/backhaul load information can then be provided to any network node which is connected to the S-GW. One example is the transmission of this information to the PDN-GW through the S5/S8 interface, or transmission of this information to the PCRF through the Gxc interface, or transmission of this information to the Element Manager.

Mapping in the PDN-GW

In this case the S-GW retransmits the MACEI and the MACL to the PDN-GW through the S5/S8 interface, and the PDN-GW performs the mapping in the same way described for the S-GW case. The eNB/backhaul load information can be used locally by the PDN-GW for performing load balancing actions between eNB's, or it can be provided to any network node which is connected to the PDN-GW and that could manage the load balancing functions.

Mapping in the PCRF

In this case the S-GW retransmits the MACEI and the MACL to the PDN-GW through the S5/S8 interface, and the PDN-GW retransmits it to the PCRF through the Gx interface. The eNB/backhaul load information can be used locally by the PCRF for issuing load balancing policies between eNB's, or it can be provided to any network node which is connected to the PCRF and that could manage the load balancing functions.

Mapping in a node specifically dedicated to load balancing policies, for example an Element Manager for the management of the RAN and EPC equipment.

Mapping in the Operations support systems (OSS) or in the Operation & Maintenance (O&M) system.

Figure 6:
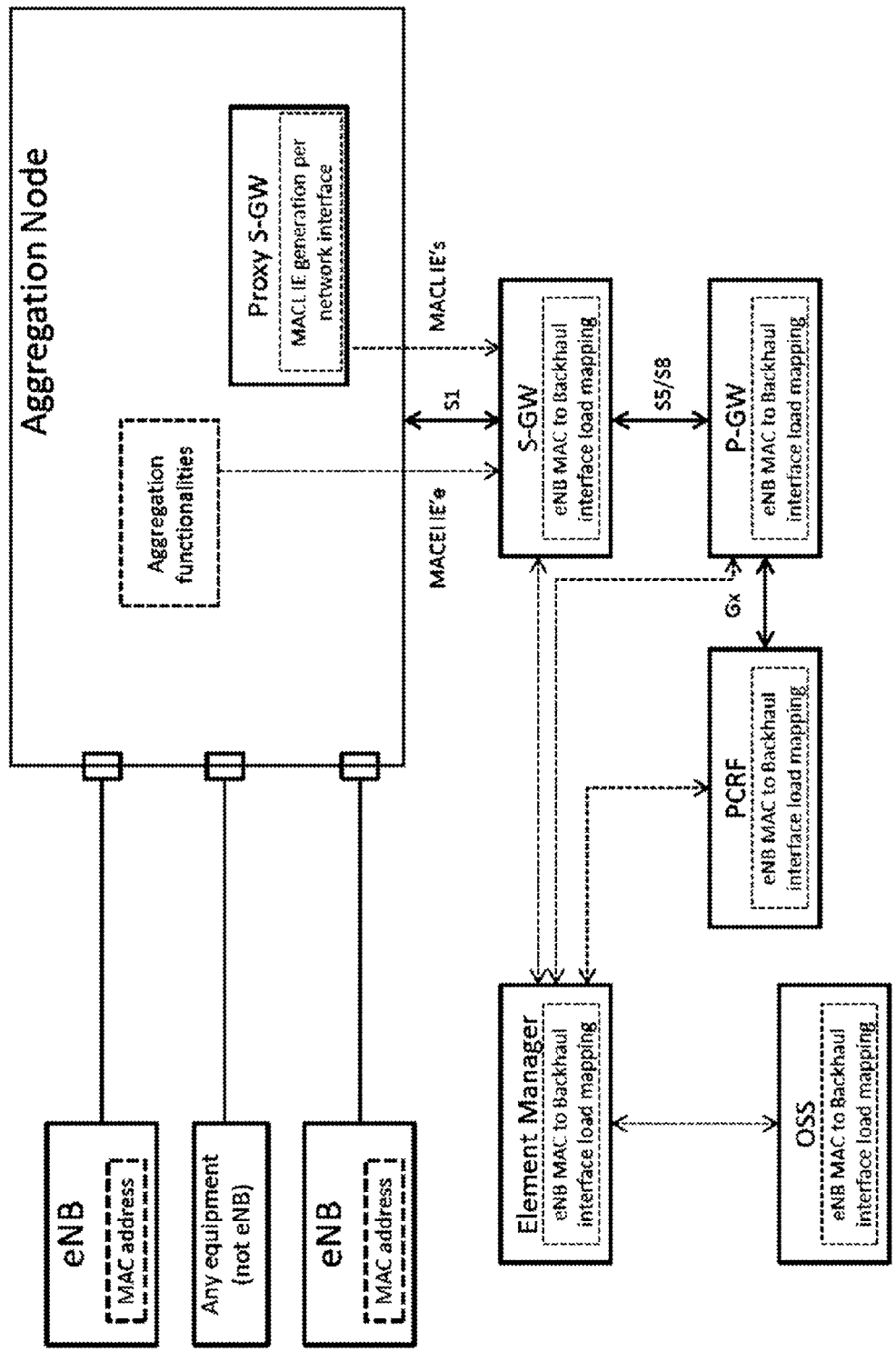
FIG. 6, shows different options for backhaul load mapping to an eNB in the network elements, according to an embodiment.

FIG. 6 shows a general scheme of MACEI IE's and MACL IE's provision to the network nodes where the eNB to backhaul interface load mapping can be done.

Load Balancing Enforcement Based in the Backhaul Load Mapping to eNB's:

Currently 3GPP standards does not define which network element is in charge with enforcing the load balance between the eNB's of the Radio Access Network (RAN), in particular when many different 3GPP-standarized RAN are connected to the EPC, or when non-3GPP radio networks are connected to the EPC. Therefore this invention does not preclude any network node to enforce the load balance based on the mapping of backhaul load to every eNB.

Some of the possible embodiments of this load balancing enforcement based on the backhaul load to eNB are:

Enforcement in the PDN-GW

The enforcement of the load balancing can be done in the PDN-GW, using local information if the eNB to backhaul load mapping is done in the PDN-GW, or receiving the mapping information from any other node. The PDN-GW will set up UE's bearers taking into account the backhaul load information of the eNB the UE is going to connect to.

Enforcement in the PCRF

The enforcement of the load balancing can be done in the PCRF by means of PCC rules, using local information if the eNB to backhaul load mapping is done in the PCRF, or receiving the mapping information from any other node. The PCRF will provide PCC rules to the PDN-GW, who will set up UE's bearers accordingly.

Enforcement in the ANDSF

Access Network Discovery and Selection Function (ANDSF) is defined in 3GPP TS 23.402 [3] and its current role aiding in the discovery and selection of radio access networks. The ANDSF could provide network selection rules based on the backhaul load to eNodeB mapping Enforcement in a node specifically dedicated to load balancing policies Enforcement in the Operations support systems (OSS) or in the Operation & Maintenance (O&M) system.

The specific load balancing procedures or criteria, enforced in any of the previously mentioned network nodes, are not part of this invention.

ADVANTAGES OF THE INVENTION

This invention allows the identification of the backhaul load of every eNB and take into account that backhaul load as another parameter for UE's traffic assignment to different eNB's, to different RAN's (for example, 3G or LTE) or to different RAT's (for example IEEE 802.11 Wi-Fi Access Points). The advantages of this invention are:

UE's can be assigned to an eNB or any other base station or access point with a less congested backhaul.

The invention helps using low data rate or variable data rate technologies for supporting the backhaul of an eNB, base station or access point.

The invention provides a better quality of service to the UE's, avoiding a poor performance when a UE connects to an eNB, base station or access point whose backhaul is congested.

When the eNB, base station or access point backhaul is shared with other access service, for example with domestic users served by a GPON network, some UE'S traffic to the eNB, base station or access point supported by the shared network can be diverted to other eNB's, base stations or access points in order to provide more access resources for the domestic users.

ACRONYMS

3GPP 3rd Generation Partnership Project
ADSL Asymmetric Digital Subscriber Line
ANDSF Access Network Discovery and Selection Function
DSLAM Digital Subscriber Line Access Multiplexer
ECGI E-UTRAN Cell Global Identification
eNB Evolved Node B
EPC Evolved packet Core
GPON Gigabit Passive Optical Network
HSPA High Speed Packet Access
IE Information Element
LTE Long Term Evolution
MAC Media Access Control
MACEI MAC-eNB Identification
MACL MAC Load
MME Mobility Management Entity
OSS Operations Support System
PCC Policy and Charging Function
PCRF Policy and Charging Rules Function
PDN-GW Packet Data Network Gateway
PLMN Public Land Mobile Network
RAN Radio Access Network
RAT Radio Access Technology
S1 Interface between the eNodeB and the S-GW
S5/S8 Interface between the S-GW and the PDN-GW
SC Small Cell
S-GW Serving Gateway
SSID Service Set IDentifier
UMTS Universal Mobile Telecommunication System
VDSL Very high bit-rate Digital Subscriber Line
xDSL Digital Subscriber Loop

REFERENCES

[1] 3GPP TS 23.401 v10.2.1 Technical Specification Group Services and System Aspects; General Packet Radio Service (GPRS) enhancements for Evolved Universal Terrestrial Radio Access Network (E-UTRAN) access (Release 10). Section 4.2 Architecture reference model

[2] 3GPP TS 36.413 v10.5.0 Technical Specification Group Radio Access Network; Evolved Universal Terrestrial Radio Access Network (E-UTRAN); S1 Application Protocol (S1AP). Section 9.2 Information Element Definitions.

[3] 3GPP TS 23.402 V11.1.0 Technical Specification Group Services and System Aspects; Architecture enhancements for non-3GPP accesses (Release 11). Section 4.8 Network Discovery and Selection Torsten Musiol: "Transport" In: "LTE for UMTS: Evaluation to LTE-Advanced", 4 Mar. 2011 (2011 Mar. 4), John Wiley and Sons, XP055090093, ISBN: 978-0-47-066000-3 pages 325-350, 001: 10.1 002/9781119992943. ch12.

The invention claimed is:

1. A method for assigning radio resources to small cells in 3GPP networks, said method comprising:
   providing by a plurality of eNodeB wireless mobile connectivity to a plurality of User Equipment (UE); and
   aggregating, using a node running in a non-3GPP network, backhaul load information related to the access line of each one of said plurality of eNodeB, or any other remote equipment, providing said wireless mobile connectivity,
   wherein each one of said plurality of eNodeB includes an eNodeB identification and a MAC address of said eNodeB, the method further comprising:
   a) receiving, by a Proxy Serving Gateway (Proxy S-GW) located in said non-3GPP node, the MAC address of each one of the interfaces of said non-3GPP node on which said backhaul load information aggregation has been done and a traffic load of said received MAC address;
   b) communicating said Proxy S-GW with a Service Gateway (S-GW) pertaining to a 3GPP network using a standard S1 interface; and
   c) sending to said S-GW, through said standard S1 interface, in order to assign radio resources to said plurality of eNodeB, the received MAC address of each one of the interfaces of the non-3GPP node and the traffic load thereof,
   wherein:
   said S-GW receives said MAC address of the interfaces and said traffic load thereof and said eNodeB identification and said MAC address of said eNodeB, termed as information elements, from said Proxy S-GW and from said eNodeB through said standard S1 interface, and
   said information elements are transmitted, from said S-GW to said PDN-GW, said PDN-GW further transmitting said information elements to a Policy and Charging Rules Function (PCRF) node and further performing mapping of the information elements in said PCRF node.

2. The method according to claim 1, wherein said S-GW further performs a mapping of said information elements.

3. The method according to claim 2, further comprising performing a load balancing based on said mapping of backhaul load to each one of said plurality of eNodeB.

4. The method according to claim 1, further comprising transmitting said information elements, from the S-GW to a Packet Data Network Gateway (PDN-GW) and further performing the mapping of the information elements in said PDN-GW.

5. The method according to claim 1, further comprising transmitting said information elements, from said S-GW to an element manager node specifically dedicated to load balancing policies and further performing the mapping of the information elements in said element manager node.

6. The method according to claim 1, further comprising transmitting said information elements, from said S-GW to an element manager node and further performing the mapping of the information elements in an Operations support system (OSS) and/or Operation & Maintenance (O&M) system.

7. The method according to claim 1, wherein said aggregation of said backhaul load information by said non-3GPP node is performed as a point-to-multipoint radio hub, a DSLAM or an OLT.

8. The method according to claim 1, wherein said MAC address of the interfaces and said MAC address of said eNodeB are a unique identifier following any of the formats defined by the IEEE such as a MAC-48 and EUI-48 or EUI-64, among others.

9. The method according to claim 1, wherein said traffic load is any instantaneous throughput measure as bits per second, an average throughput over a given time, or a percentage of the maximum throughput supported by each one of said MAC address interface.

10. The method according to claim 1, wherein said eNodeB is identified by any 3GPP standardized way such as a Global eNB ID or a E-UTRAN CGI (ECGI), among others.

11. A system for assigning radio resources in 3GPP networks, comprising:
   a plurality of eNodeB configured to provide wireless mobile connectivity to a plurality of User Equipment (UE); and
   a node running in a non-3GPP network configured to aggregate a backhaul load information related to an access line of each one of said plurality of eNodeB providing said wireless mobile connectivity,
   wherein each one of said plurality of eNodeB includes an eNodeB identification and a MAC address of said eNodeB and the system further comprises:
   a Proxy Serving Gateway (Proxy S-GW) located in said non-3GPP node, configured to:
   receive the MAC address of each one of the interfaces of said non-3GPP node on which said backhaul load information aggregation has been done and a traffic load of said received MAC address, and
   communicate with a Service Gateway (S-GW) pertaining to a 3GPP network using a standard S1 interface, and
   send to said S-GW, through said standard S1 interface, in order to assign radio resources to said plurality of eNodeB, the received MAC address of each one of the interfaces of the non-3GPP node and the traffic load thereof; and
   said standard S1 interface arranged to communicate said Proxy S-GW with said S-GW,
   wherein:
   said S-GW receives said MAC address of the interfaces and said traffic load thereof and said eNodeB identification and said MAC address of said eNodeB, termed as information elements, from said Proxy S-GW and from said eNodeB through said standard S1 interface, and said information elements are transmitted, from said S-GW to said PDN-GW, said PDN-GW further transmitting said information elements to a Policy and Charging Rules Function (PCRF) node and performing mapping of the information elements in said PCRF node.

\* \* \* \* \*